US006968433B2

(12) United States Patent
Lanzatella et al.

(10) Patent No.: US 6,968,433 B2
(45) Date of Patent: Nov. 22, 2005

(54) SYSTEM AND METHOD FOR CONTROLLING THE CREATION OF STABLE DISK IMAGES

(75) Inventors: Thomas W. Lanzatella, Minneapolis, MN (US); Graham Bromley, Dublin, CA (US); John A. Colgrove, Los Altos, CA (US); Ron Karr, Palo Alto, CA (US); Blaine T. Cuykendall, San Jose, CA (US); Oleg Kiselev, Palo Alto, CA (US); Craig Harmer, San Francisco, CA (US)

(73) Assignee: Veritas Operating Corporation, Mountain View, CA (US)

( * ) Notice: Subject to any disclaimer, the term of this patent is extended or adjusted under 35 U.S.C. 154(b) by 253 days.

(21) Appl. No.: 10/087,901

(22) Filed: Feb. 28, 2002

(65) Prior Publication Data

US 2003/0163658 A1 Aug. 28, 2003

(51) Int. Cl.[7] ............................................. G06F 12/00
(52) U.S. Cl. ..................................... 711/163; 711/167
(58) Field of Search ........................ 711/161–162, 163, 711/167; 707/203–204; 713/502; 345/534

(56) References Cited

U.S. PATENT DOCUMENTS

| | | | | |
|---|---|---|---|---|
| 5,938,786 A | * | 8/1999 | Gregg | 714/748 |
| 5,991,542 A | | 11/1999 | Han et al. | 395/712 |
| 6,029,168 A | | 2/2000 | Frey | 707/10 |
| 6,078,932 A | * | 6/2000 | Haye et al. | 707/204 |
| 6,708,227 B1 | * | 3/2004 | Cabrera et al. | 719/328 |
| 6,718,447 B2 | * | 4/2004 | Cochran | 711/162 |
| 6,721,902 B1 | * | 4/2004 | Cochran | 714/6 |

OTHER PUBLICATIONS

Surajit Chaudhuri, An Overview of Query Optimization in Relational Systems, Proceedings of the ACM PODS, Jun. 1998, pp 34-43.*
Webopedia web site, available from the Internet Archive at http://web.archive.org/web/20000621114956/http:// www.webopedia.com/TERM/A/API.html, Jun. 21, 2001.*
Principia Cybernetica Web, "Decision Theory", http://web.archive.org/web/20000229130444/http:// pespmc1.vub.ac.be/ASC/DECISI_THEOR.html, Feb. 2000.*
"Storage Area Networking—High-Speed Data Sharing Among Multiple Computer Platforms", *Tivoli Systems, Inc., Copyright 2000*, http://www.tivoli.com/products/documents/whitepapers/san_datasharing_wp.pdf, (2000),4 pages.
"Storage Management—Best Practices", *Copyright 2001, IBM Corp.*, http://www.tivoli.com/products/documents/whitepapers/wp-storage-bp.pdf,(2001),11 pages.
Amiri, Khalil S., "Scalable and manageable storage systems", *Ph. D. Thesis, Dept. of Electrical and Computer Engineering, Carnegie Mellon University, Pittsburgh, PA*, http://www.pdl.cmu.edu/PDL-FTP/NASD/amiri_thesis.pdf,(Dec. 2000),i-241.
Wylie, Jay J., "Selecting the Right Data Distribution Scheme for a Survivable Storage System", *Research Paper, School of Computer Science, Carnegie Mellon University, Pittsburgh, PA*, http://www.pdl.cmu.edu/PDL-FTP/Storage/CMU-CS-01-120.pdf,(May 2001),pp. 1-21.

* cited by examiner

*Primary Examiner*—Pierre M. Vital
(74) *Attorney, Agent, or Firm*—Meyertons Hood Kivlin Kowert & Goetzel, P.C.; B. Noël Kivlin

(57) ABSTRACT

A system and method for controlling the creation of stable disk images. Data is transmitted to an application program interface identifying the storage object. The application program interface returns a list with one or more methods appropriate for quiescing or for freezing the storage object.

18 Claims, 14 Drawing Sheets

| 4 | atomic multi-file-system |
|---|---|
| 3 | serial file-system |
| 2 | atomic device level |
| 1 | serial device level |
| 0 | none |

*FIG. 11*

SYSTEM AND METHOD FOR CONTROLLING THE CREATION OF STABLE DISK IMAGES

CROSS-REFERENCE TO RELATED APPLICATION

This application is related to the following co-pending, commonly assigned, U.S. patent applications: "Methods, Functional Data, and Systems to Represent a Storage Environment," Ser. No. 09/997,602 file Nov. 29, 2001; "Methods and Systems to Backup Data," Ser. No. 10/087,597, filed herewith, "Methods, Systems, and Apparatus to Interface with Storage Objects," Ser. No. 09/997,612 filed Nov. 29, 2001; "Systems, Methods, and Apparatus for Creating Stable Disk Images" Ser. No. 10/087,230, filed herewith; "Methods and Systems to Interface Storage Objects," Ser. N0. 09/997,350, filed Nov. 29, 2001; and "System and Method for Characterizing Logical Storage Devices" Ser. No. 10/086,656, filed herewith, each of which is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright© 2002, VERITAS Software Company., All Rights Reserved.

FIELD OF THE INVENTION

This invention relates generally to storage management, and more particularly to a system and method for controlling the creation of stable images of storage objects distributed across two or more storage devices.

BACKGROUND OF THE INVENTION

Networks can be used to connect storage devices to computing devices (e.g., clients, servers, and the like). For instance, in a Storage Area Network (SAN), a Fibre Channel network is used to connect computing devices to storage.

In a typical network-based storage environment, all computing devices have access to the available storage devices. Connectivity among the computing devices and the underlying storage devices within the storage environment is shared. This approach provides a wide variety of benefits, including more efficient server platform fail-over. That is, a failed storage device can be replaced automatically by another operational server platform without the need to change cabling to the storage devices.

A new class of distributed computer application has been developed to share access to storage devices across server platforms. These applications seek to use the shared connectivity afforded by SAN technology to share simultaneous access to data at I/O rates that are consistent with the speed of the SAN network. Prior to the development of SAN technology, local and wide area networks provided connectivity between computing devices that did not include storage devices. Connections were established with network protocols such as Transmission Communication Protocol (TCP), Unreliable Datagram Protocol (UDP), and others.

Distributed File Systems such as network file system (NFS) and common Internet file system (CIFS) were layered on top of the network protocols. Distributed File Systems mediate shared access to files across a network. The services provided by distributed file systems are, however, not without significant performance cost. While access to data may be transparent, the rate at which data can be transported between client and server in a distributed file system is limited by the high overhead of managing communication protocols. For instance, the overhead of managing communication protocols limits application I/O rates to a level far below what can be achieved to storage devices that are directly connected to the server platform. Because of this limitation, only applications with relatively low I/O rates can share data using distributed file systems.

SAN systems make storage devices accessible to multiple server platforms and, often, the data stored is accessed by more than one application. One strategy for ensuring the integrity of shared data in a SAN environment is to stabilize (or freeze) a storage object (such as a file system or volume) on one server platform and then to allow access to the same object on another server platform.

Various strategies can be employed to ensure that a disk object remains frozen between two points in time. The simplest method of keeping a disk object frozen is to change the mode of a file system to read-only. This is a drastic and awkward process because the file system is unusable until the remote component completes its work.

Another scheme is distributed lock management. A semaphore is established that can be shared across platforms or among applications. Before mapping, a lock is taken on the object and is retained until relinquished by the remote machine. Distributed lock management has the advantage of arbitrarily fine scale because the semaphore can be designed to encompass individual bytes if necessary. The overhead of managing locks, however, can become cumbersome, and can hinder performance. Locking mechanisms can also block application access to data for long periods and may lead to deadlocks.

The most prevalent strategy for stabilizing disk images is the use of snapshots and mirrors. These mechanisms have the advantage of imposing the least impact on the application because they can be invoked very rapidly. The images created by snapshot and mirror will be referred to collectively as frozen images.

As the storage environment becomes more complex, so does the difficulty of generating a frozen image. A storage environment may consist of many layers of storage objects, or abstractions. For instance, a storage object may be a file system built on top of a volume that is made up of many storage devices. Or a storage object may be distributed across many storage devices, or may consist of file systems built on volumes on a large number of storage devices. The complexity of the storage environment grows dramatically with the number of file systems, volumes and devices, and the choices faced while creating a frozen image within such environments grow proportionately with that complexity. Applications which need to quiesce or to freeze all or portions of the storage environment are faced with the complex job of understanding every aspect of the storage environment.

For the reasons stated above, and for other reasons stated below which will become apparent to those skilled in the art upon reading and understanding the present specification, there is a need in the art for a system and method for controlling the formation of stable images of a diverse group of logical storage objects.

SUMMARY OF THE INVENTION

The above-mentioned shortcomings, disadvantages and problems are addressed by the present invention, which will be understood by reading and studying the following specification.

In one aspect of the present invention, a system and method is described for controlling the creation of stable disk images. Data is transmitted to an application program interface identifying the storage object. The application program interface returns a freeze list with one or more freeze methods appropriate for freezing the storage object.

In another aspect of the present invention, a system and method is described for controlling the creation of stable disk images. Data is transmitted to an application program interface identifying the storage object. The application program interface returns a quiesce list with one or more quiesce methods appropriate for quiescing the storage object.

According to another aspect of the present invention, a system and method of freezing a storage object includes transmitting data to an application programming interface identifying the storage object, receiving a freeze list with one or more freeze methods appropriate for quiescing the storage object from the application programming interface, selecting one of the freeze methods and issuing a command to the application programming interface to execute the freeze method.

According to yet another aspect of the present invention, an application program interface for controlling formation of a frozen image of a storage object includes a storage object identifier, a freeze list data structure, a freeze method identifier and a data structure for returning a frozen image corresponding to a selected freeze method. The freeze list data structure stores data representing one or more freeze methods appropriate for freezing the storage object. The freeze method identifier identifies a selected freeze method from the one or more freeze methods.

According to yet another aspect of the present invention, an application program interface for controlling quiescing of a storage object includes a storage object identifier, a quiesce list data structure and a quiesce method identifier. The quiesce list data structure stores data representing one or more quiesce methods appropriate for quiescing the storage object. The quiesce method identifier identifies a selected quiesce method from the one or more quiesce methods.

According to yet another aspect of the present invention, a system and method of identifying quiesce methods appropriate for a storage object includes transmitting data to the application programming interface identifying the storage object and receiving a quiesce list with one or more quiesce methods appropriate for quiescing the storage object from the application programming interface.

The present invention describes systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 11 is a block diagram of a table that illustrates quality of quiesce for different quiesce types.

DETAILED DESCRIPTION OF THE INVENTION

In the following detailed description of embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

As noted above, it is difficult to quiesce storage in a heterogeneous storage environment. For one thing, the software elements within an operating system responsible for managing the relationship between an application and its data on storage devices play an important role in the creation of frozen images.

Figure 1:
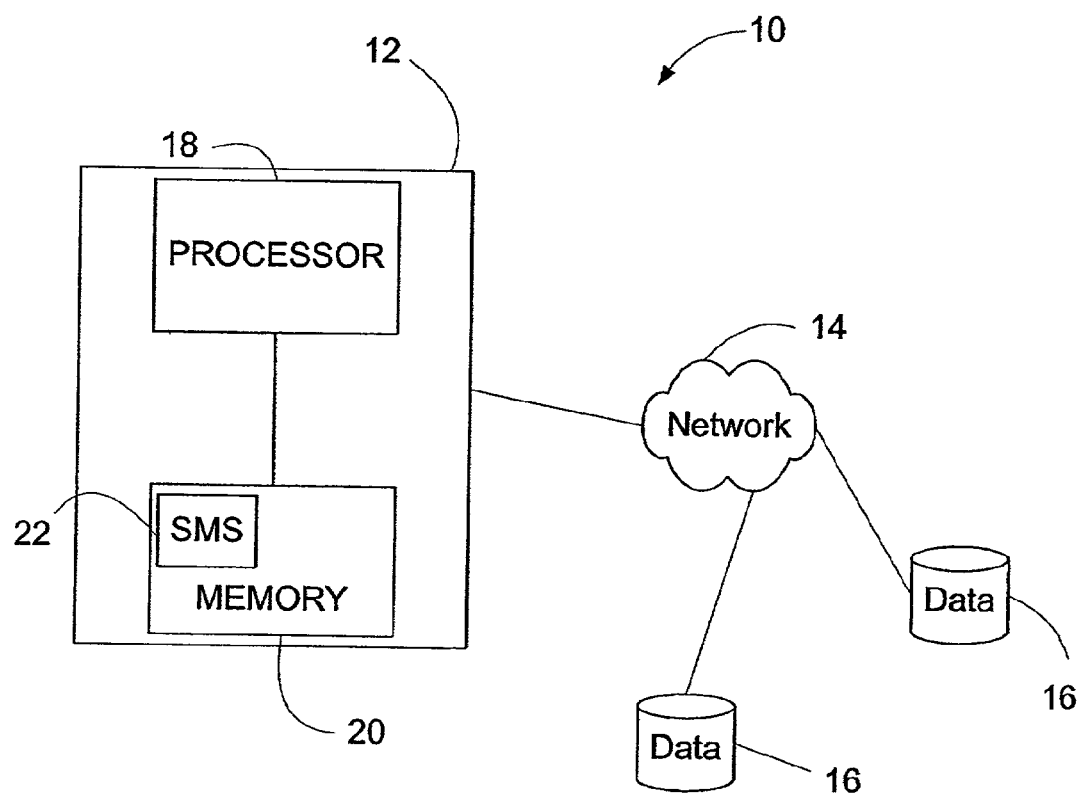
FIG. 1 is a block diagram of a network-based computing system.

A representative network-based computing system 10 is shown in FIG. 1. System 10 includes one or more computers 12 connected over a network 14 to one or more storage devices 16. Each computer 12 includes a processor 18 and memory 20.

Embodiments of the present invention are described in terms of a computer 12 executing computer-executable instructions. However, some embodiments of the present invention can be implemented entirely in computer hardware in which the computer-executable instructions are implemented in read-only memory. One embodiment of the invention can also be implemented in client/server computing environments where remote devices that are linked through communications network 14 perform tasks. Program modules can be located in both local and remote memory storage devices in a distributed computing environment.

In one embodiment, one of the computers 12 includes a storage management stack 22. In the embodiment shown in FIG. 1, storage management stack 22 is stored in memory 20. In another embodiment, storage management stack is stored in processor 18, or in one or the storage devices 16.

Figure 2:
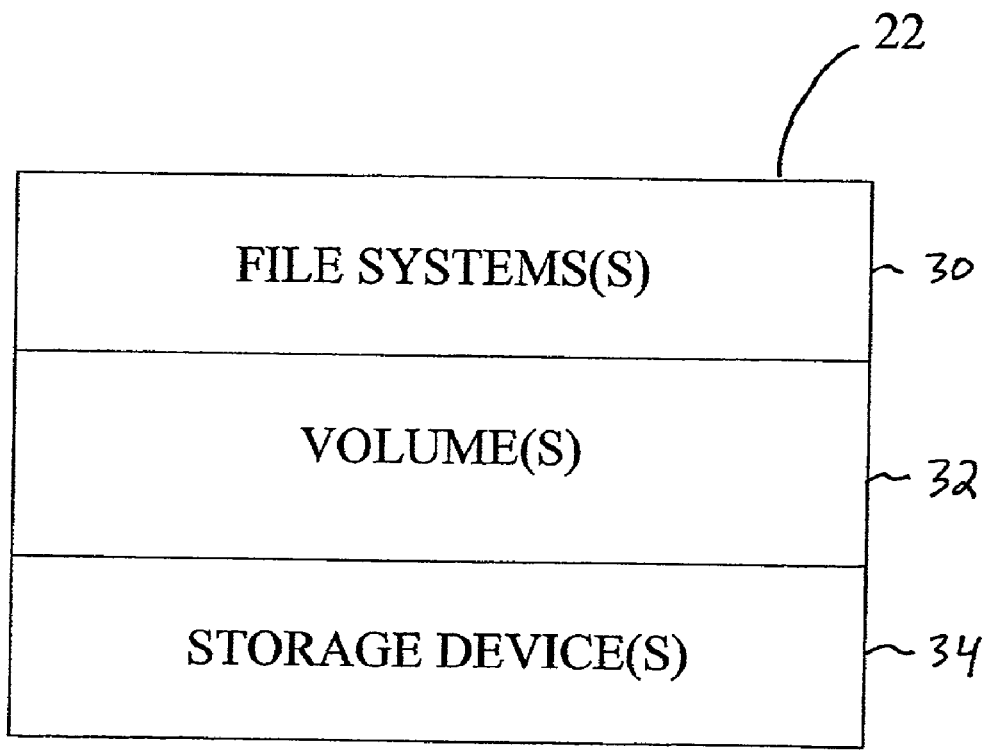
FIG. 2 illustrates a storage management stack for the system of FIG. 1.

A storage management stack 22 is the collection of software elements responsible for managing user data. As is shown in FIG. 2, a stack 22 usually includes a file system 30 and one or more volumes 32. Each volume includes one or more physical storage devices 34. Subdivisions of volumes may be actual disk devices or partitions of disk devices.

In the following discussion, a file system is a system for presenting a file abstraction to the user processes. It is the primary agent used by most applications to access data. A representative storage management stack 22 is shown in FIG. 2. As is shown in FIG. 2, file systems 30 are built on top of volumes 32. A volume is an aggregation of one or more storage devices 34 such that the devices have the appearance of continuous expanses of disk space. Volumes are maintained by volume managers.

Storage management stacks are variable and may differ from server to server depending on how the administrator has configured the environment. Additionally, some applications circumvent the file system and operate directly on volumes or even on disk devices or disk partitions.

The storage management stack is integral to the creation of frozen images for two reasons. The first reason is that modern file systems and volume managers often have the ability to create some kind of frozen image. Conventionally, file systems are capable of creating snapshots, while volume managers have the ability to create mirrors. There is, however, no hard and fast rule. Additionally, many modern storage devices, specifically disk arrays, have the ability to create frozen images.

The second reason is that most file systems cache data within internal buffers in order to increase performance and maximize the efficiency of their references to disk devices.

When an application requests that a frozen image be created, the application has some expectation as to what data is contained within the storage object to be frozen. When stack elements maintain caches between applications and storage devices, the actual on-disk image of the storage object can differ from what the application expects by the amount of data that is cached within the stack. It is therefore important for all requests to create a frozen image to be preceded by a request to flush the cache(s) associated with the storage management stack elements.

Applications that request frozen images are faced with numerous problems.

1. Frozen images may originate at any point in the software stack, i.e., at the file system, volume manager or device level.

2. The syntax of the command sequence that creates a frozen image is different for each agent with frozen image capabilities.

3. Each element of the stack that maintains a cache must be instructed to flush its cache.

Each level of storage management stack 22 plays a role in maintaining a storage object. Starting at the top of the stack, a storage object may be a file system built on top of a volume that is made up of many storage devices. Storage objects may, therefore, be distributed across many storage devices. Moreover, a storage object may consist of several file systems built on several volumes on an even larger number of storage devices. It will be apparent to those skilled in the art that the complexity of the storage environment grows geometrically with the number of file systems, volumes and devices and that the choices or methods for creating a frozen image within such environments grows proportionately with that complexity.

The detailed description is divided into four sections. In the first section, a system level overview of the invention is presented. In the second section, methods for an embodiment of the invention are provided. In the third section, a particular object-oriented Internet-based implementation of the invention is described. Finally, in the fourth section, a conclusion of the detailed description is provided.

Figure 3:
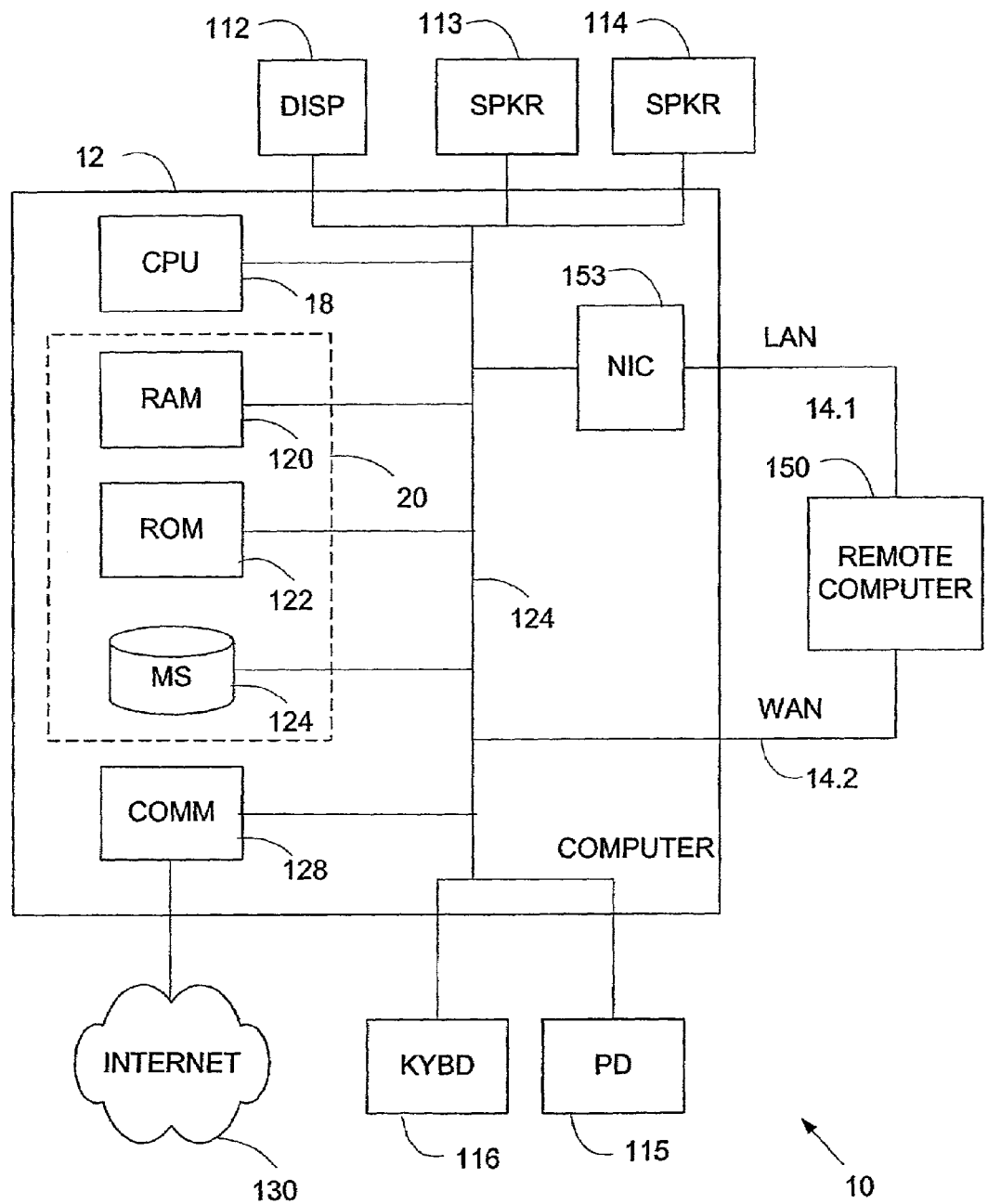
FIG. 3 illustrates one embodiment of the system of FIG. 1.

One embodiment of a computer 12 is shown in FIG. 3. As shown in FIG. 3, in one embodiment, computer 12 is operatively coupled to display device 112, pointing device 115, and keyboard 116. As noted above, computer 12 includes a processor 18, memory 20 and a system bus 126 that operatively couples various system components including the system memory 20 to the processing unit 18. Processor 18 may be a commercial microprocessor such as one available from, for instance, Intel, Motorola, Cyrix and others. In the embodiment shown, memory 20 includes random-access memory (RAM) 120, read-only memory (ROM) 122 and one or more mass storage devices 124.

Mass storage devices 124 include various types of non-volatile storage media and can include a hard disk drive, a floppy disk drive, an optical disk drive, and a tape cartridge drive. Memory 120 and 122, and mass storage devices 124 are types of computer-readable media.

A user enters commands and information into the computer 12 through input devices such as a pointing device 115 and a keyboard 116. Other input devices (not shown) can include a microphone, joystick, game pad, satellite dish, scanner, or the like. The processor 18 executes computer programs stored on the computer-readable media. Embodiments of the present invention are not limited to any type of computer 12. Computer 12 may be, for instance, an IBM-compatible personal computer (PC) running a commercially available Microsoft Windows® or UNIX—based operating system, or an Apple computer running Apple MacOS®.

In one embodiment, computer 12 is communicatively connected to the Internet 130 via a communication device 128. In one embodiment, communication device 128 is a modem that responds to communication drivers to connect to the Internet via what is known in the art as a "dial-up connection." In another embodiment, communication device 128 is an Ethernet(® or similar hardware network card connected to a local-area network (LAN) that itself is connected to the Internet via, for example, a "direct connection" (e.g., T1 line, etc.).

Computer 12 can be operated using at least one operating environment to provide a graphical user interface including a user-controllable pointer. Some such operating environments include the various versions of Microsoft Windows® and Apple MacOS® mentioned above. Embodiments of the present invention are not, however, limited to any particular operating environment.

Display device 112 permits the display of information, including computer, video and other information, for viewing by a user of computer 12. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126.

In addition to a monitor, in one embodiment computer 12 includes other peripheral input/output devices such as printers (not shown), speakers, pointing devices and a keyboard. Speakers 113 and 114 provide the audio output of signals. Speakers 113 and 114 are also connected to the system bus 126. Pointing device 115 permits the control of the screen pointer provided by the graphical user interface (GUI) of operating systems such as versions of Microsoft Windows®. Embodiments of the present invention are not limited to any particular pointing device 115. Such pointing devices include mice, touch pads, trackballs, remote controls and point sticks. Finally, keyboard 116 permits entry of textual information into computer 12, as known within the art, and embodiments of the present invention are not limited to any particular type of keyboard.

Computer 12 can operate in a networked environment using logical connections to one or more remote computers, such as remote computer 150. These logical connections are achieved by a communication device coupled to, or a part of, the computer 12. Embodiments of the present invention are not limited to a particular type of communications device. The remote computer 150 can be another computer, a server, a router, a network PC, a client, a peer device or other common network node. The logical connections depicted in FIG. 3 include a local-area network (LAN) 14.1 and a wide-area network (WAN) 14.2.

When used in a LAN-networking environment, computer 12 and remote computer 150 are connected to the local network 14.1 through a network interface or adapter 153. When used in a conventional WAN-networking environment, computer 12 and remote computer 150 communicate with a WAN 14.2 through, for instance, modems (not shown). In one embodiment, the modem, which can be internal or external, is connected to the system bus 126. In a networked environment, program modules depicted relative to the computer 12, or portions thereof, can be stored in a remote memory storage device 16.

SYSTEM LEVEL OVERVIEW

Figure 4:
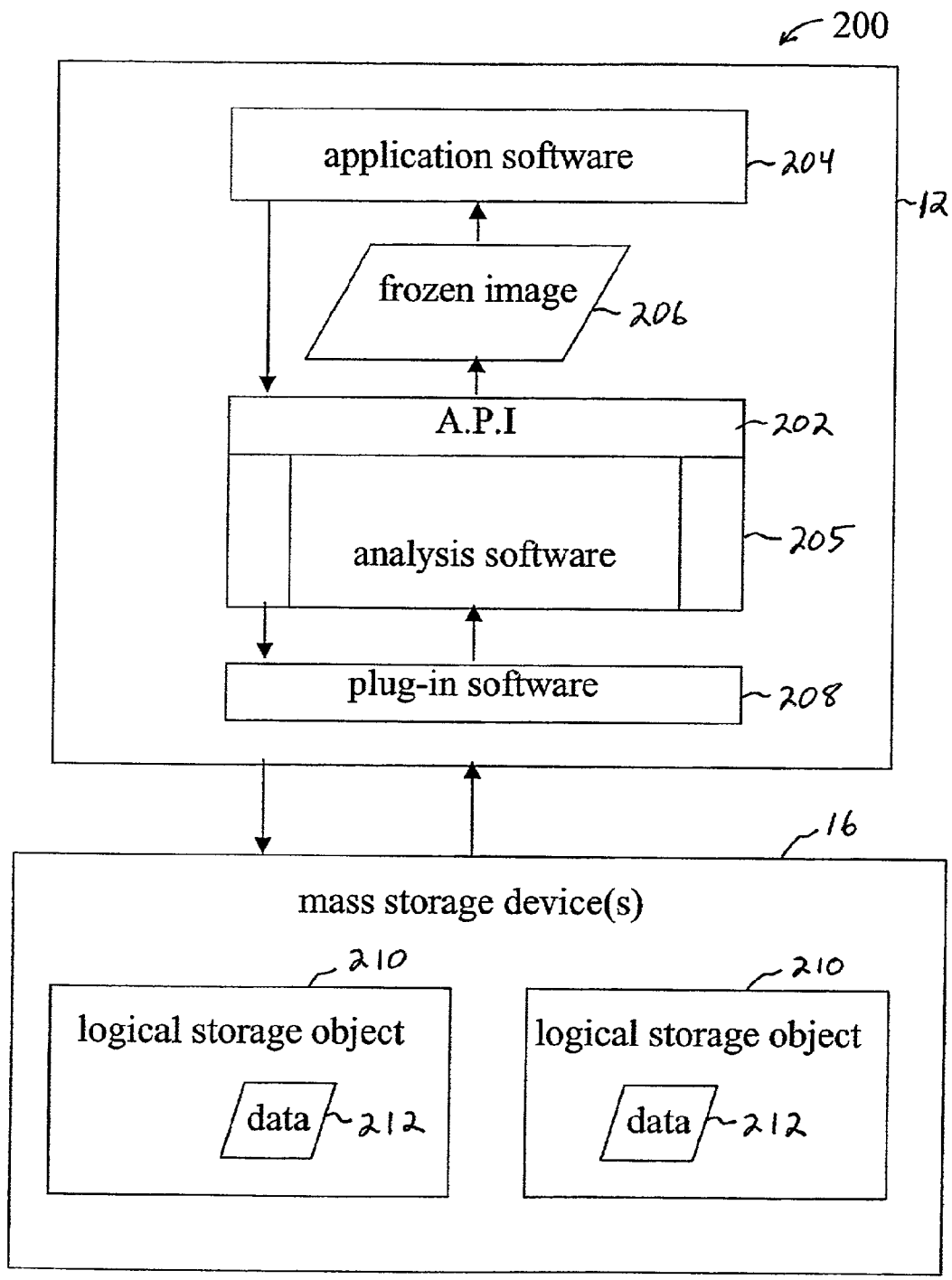
FIG. 4 is a diagram illustrating a system-level overview of an embodiment of the invention.

FIG. 4 is a block diagram that provides a system level overview of the operation of an embodiment of the present invention. In one embodiment, system 10 executes within a multi-processing, multi-threaded operating environment on a computer, such as computer 12 in FIG. 1.

As shown in FIG. 4, system 10 includes a computer 12 and at least one mass storage device 16 coupled by a network 14 to computer 12. In one embodiment, application software 204 executes as one or more programs on processor 18.

In one embodiment, mass storage device 16 includes one or more logical storage objects 210. The logical storage objects 210 include data 212 that is used by the application software 204.

FIG. 4 shows multiple layers of abstraction. For example, an application program interface (API) 202 is used to standardize the approach used by application software 204 to obtain a frozen image 206 of one or more logical storage objects 210. Similarly, plug-in software 208 provides a standard interface between analysis software 205 and mass storage devices 16. In one embodiment, the software vendor defines a plug-in interface having predefined capabilities and the producer of each mass storage device 16 defines the device to conform to the software vendors definition.

In one embodiment, application program interface (API) 202 operably couples analysis software 205 to the application software 204. API 202 provides a normalized interface to the analysis software 205 for application software 204. In one such embodiment, analysis software 205 executes as one or more programs on processor 18.

The system level overview of the operation of an embodiment of the invention has been described in this section of the detailed description. While the invention is not limited to any particular mass storage device, frozen image, logical storage objects, or application software means, for sake of clarity a simplified mass storage, frozen image, logical storage objects, or application software means device has been described.

METHODS OF AN EMBODIMENT OF THE INVENTION

In the previous section, a system level overview of the operation of an embodiment of the invention was described. In this section, various embodiments of system 10 are described by reference to a series of flowcharts. These descriptions should enables one skilled in the art to develop programs, firmware, or hardware, including any instructions needed to carry out the methods on a processor or other computing device executing the instructions from computer-readable media.

Figure 5:
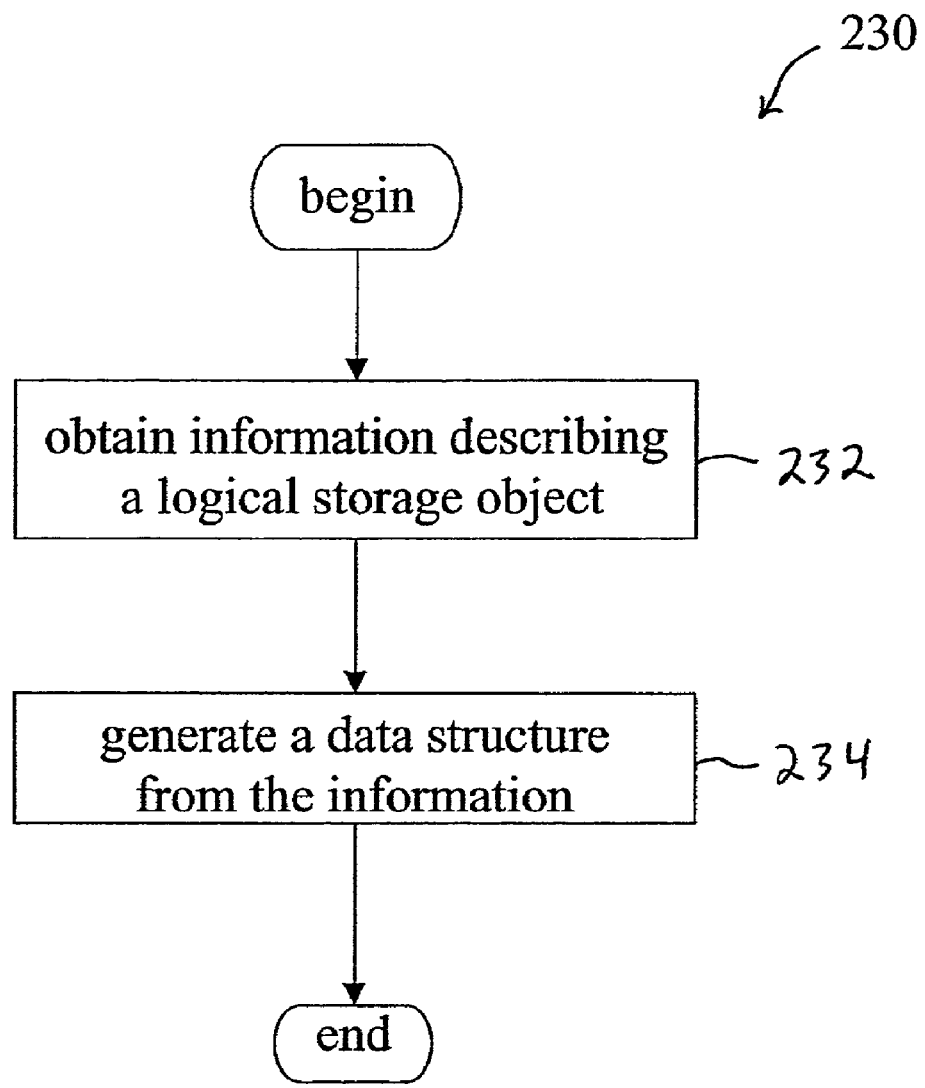
FIG. 5 is a flowchart of a method for obtaining information about logical storage objects.

FIG. 5 is a flowchart of a method 230 for generating a data structure that represents a storage environment, according to one embodiment of the invention. As shown in FIG. 5, at 232, the system obtains information describing at least one logical storage object. In some embodiments, the information includes configuration information, tactical syntax information describing how a frozen image of each of the logical storage objects is generated, and/or information describing quiesce capabilities at each of the data buffering levels of the logical storage objects.

At 234, the system generates the data structure from the information. In some embodiments, the data structure includes a plurality of nodes. Each node includes a quiesce-type attribute, a quiesce-node attribute, a split-type attribute, and a split-node attribute. Split is the manner in which the frozen image is created. In some embodiments, split type for the file system is "clone." In some embodiments, the split type for the volume manager is "mirror." The split type for the snapshot driver is snapshot, and the split type for the devices is, in the case of a Hitachi drive, a "business copy," and in the case of an EMC drive, the split type is "time finder."

Figure 6:
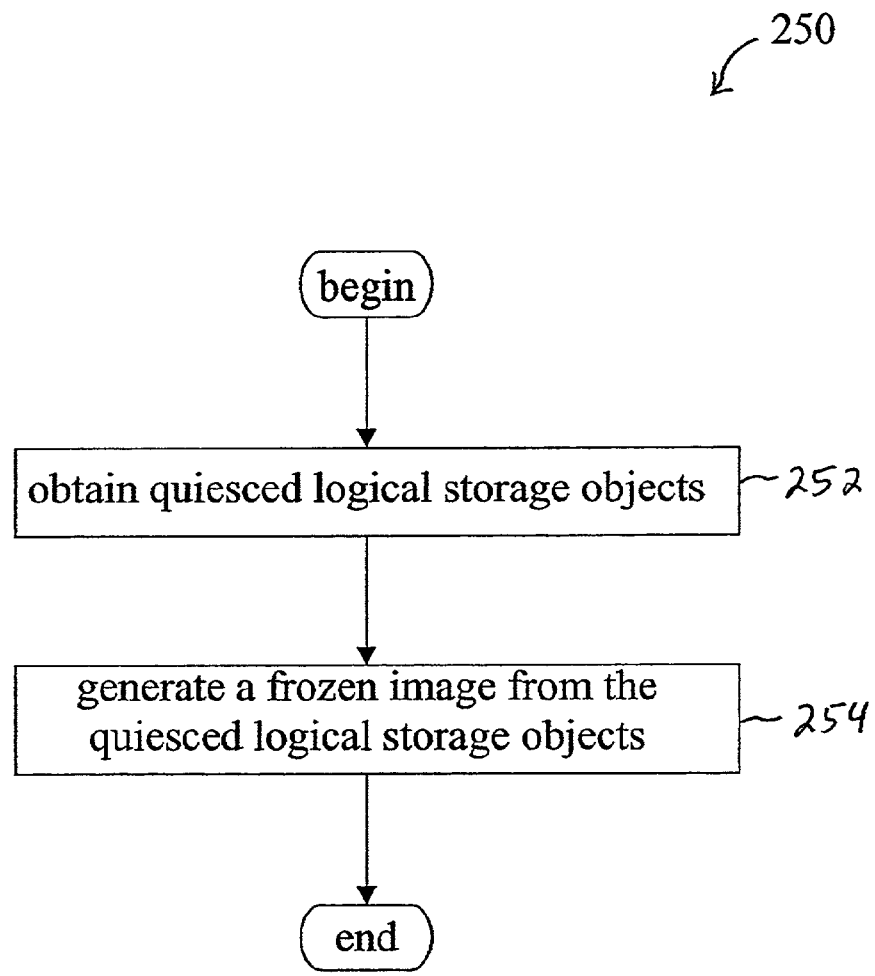
FIG. 6 is a flowchart of a method for generating a frozen image from a plurality of quiesced logical storage objects, according to an embodiment of the invention.

FIG. 6 is a flowchart of a method 250 for generating a frozen image in a storage environment, according to one embodiment of the present invention. In one such embodiment, software executing in a computing device quiesces one or more logical storage objects 210 at 252 and, at 254, generates a frozen image of the quiesced logical storage objects 210.

In some embodiments, generating a frozen image such as is shown in 254 includes determining whether or not each of the logical storage objects spans multiple stable image data sources. Where the logical storage objects span multiple stable image data sources, in one embodiment the frozen image is generated from the plurality of quiesced logical storage objects that span the multiple stable image data sources.

Figure 7:
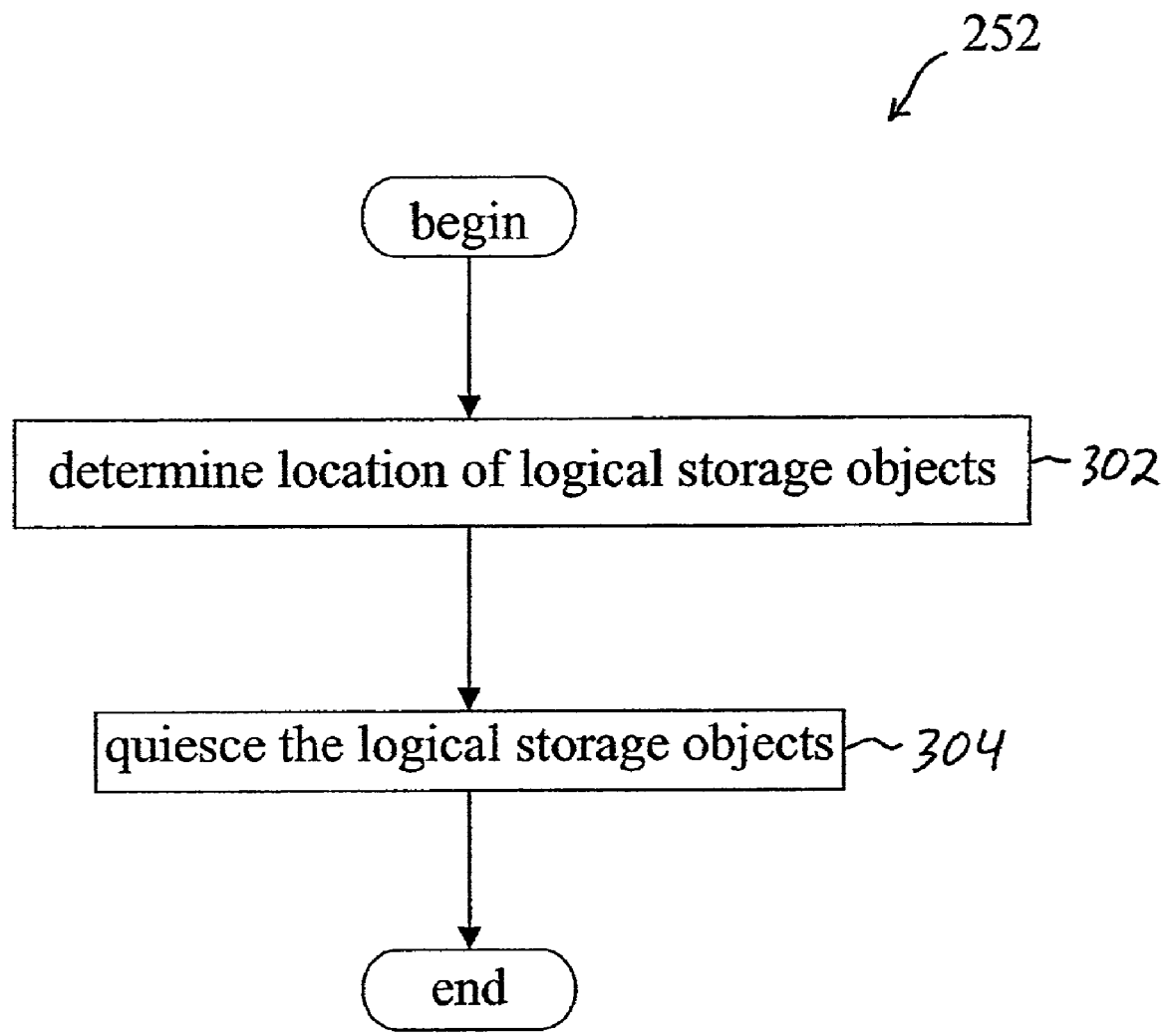
FIG. 7 is a flowchart of a method for quiescing each of a plurality of logical storage objects which can be used in the method of FIG. 6.

One embodiment of a method for quiescing one or more logical storage objects is shown in FIG. 7. In one such embodiment, at 302, software executing in a computing device determines the location of the one or more logical storage objects 210 to be quiesced and, at 304, executes program code to quiesce the logical storage objects. It should be noted that each logical storage object 210 may include two or more volumes and two or more physical storage devices. Each volume and each storage device may require a different method of quiescing, if it can be quiesced at all.

In some embodiments, quiescing includes calling a plug-in software component 208 having knowledge of the logical storage objects 210 to be quiesced. Such an approach is shown in FIG. 4.

In general, a plug-in software component acts as a bridge between a vendor-independent syntax employed by the higher-level software program and the vendor-specific syntax used by the device or object to be controlled. In the embodiment shown in FIG. 4, plug-in software component 208 acts as a bridge between vendor-specific syntax for reporting information and invoking quiesce and freeze operations for the vendor's storage object and a vendor-independent syntax employed by analysis software 205.

In one embodiment, plug-in software component 208 is tightly coupled and integrated with analysis software 205. In such an embodiment, analysis software 205 is designed to accept plug-ins; the publisher of analysis software 205 usually publishes a design specification that enables others to write plug-ins for analysis software 205. In one such embodiment of the present invention, plug-in software component 208 performs one or more quiescing operations for logical storage objects 210 associated with plug-in quiescing software component 208.

Figure 8:
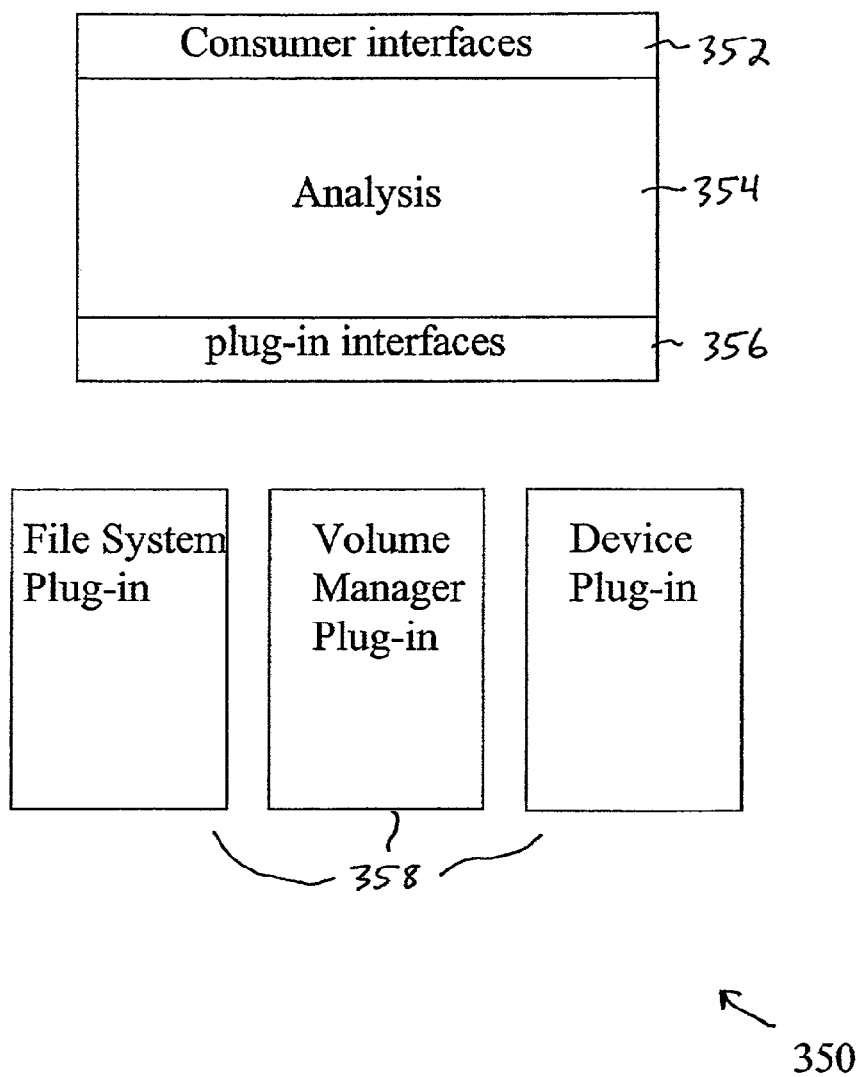
FIG. 8 is an illustration of a software architecture which can be used to retrieve information from logical storage objects which can be used to determine an optimal freeze method.

One approach for implementing system 10 is shown in FIG. 8. In the embodiment shown in FIG. 8, a software library 350 is structured as one or more consumer interfaces 352, analysis 354 and one or more plug-in interfaces 356.

In the embodiment shown, applications communicate with library 350 through consumer interfaces 352. In one embodiment, an application for performing backup operations accesses library 350 through one or more of the consumer interfaces 352 to determine the best way to freeze the logical storage devices which are to be backed up. One such application is described in "Methods and Systems to Backup Data," described above, which description is incorporated herein by reference.

Analysis 354 includes a collection of algorithms that are used to build different views of the storage environment and to extract information or perform actions based on those views. For instance, the storage environment may have different views related to freeze characteristics of the storage environment and others views related to quiesce characteristics of the storage environment. In one embodiment, each view is stored as a separate data structure.

Plug-in interface 356 extracts information that is specific to an individual storage stack element. For example, a file system, a volume manager, a device driver and a disk array supported by the method of system 10 would each have a plug-in 358 that would convey information regarding the storage stack element to plug-in interface 356.

In one embodiment, plug-ins 358 are divided into two groups. One set of plug-in interfaces is defined for mapping while another is defined for frozen image.

Figure 9:
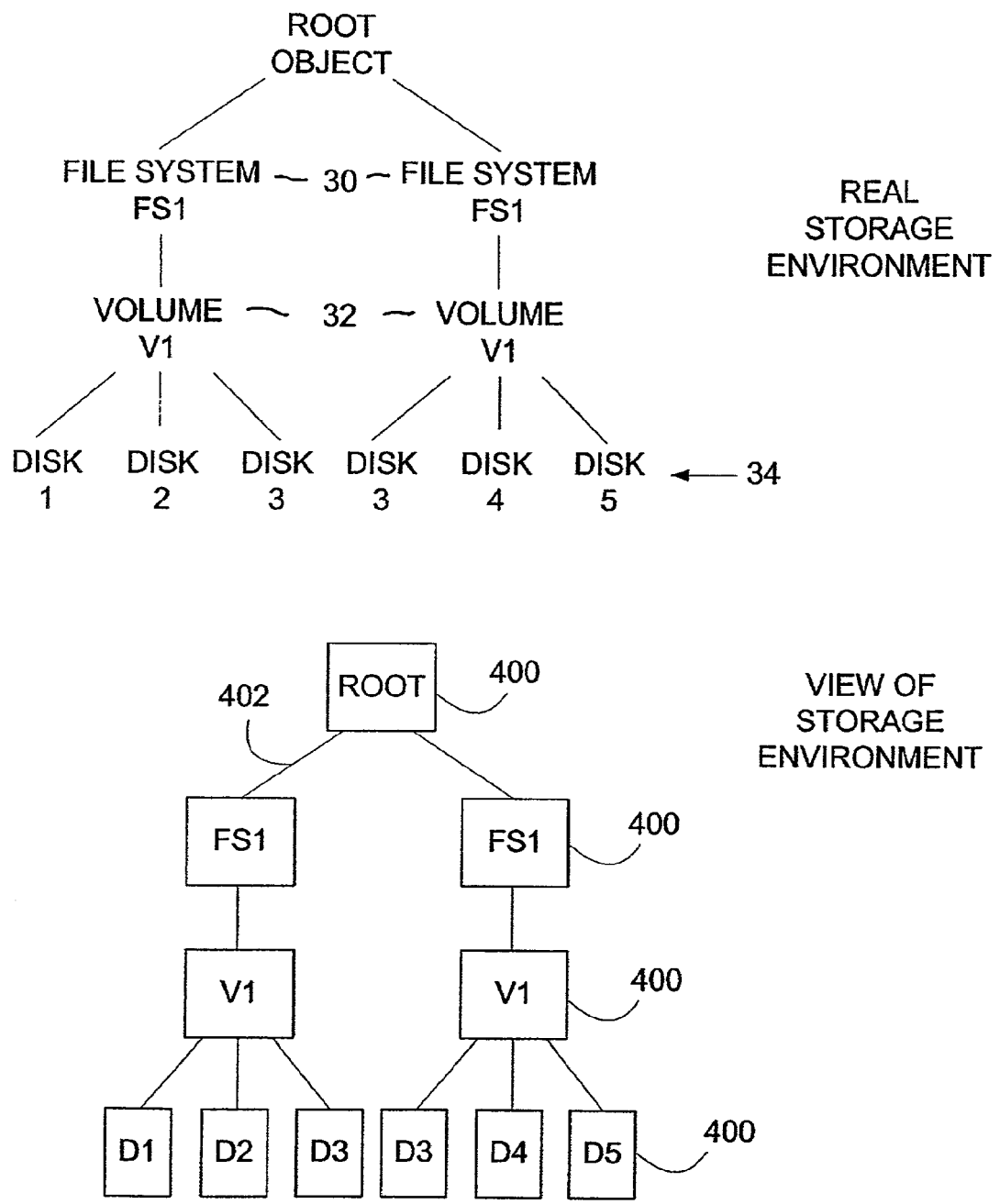
FIG. 9 is an illustration of one approach for mapping of a real storage environment to a logical storage environment.

In one embodiment, storage environment views are presented as a collection of linked structures 400 within a storage stack 390. Each linked structure 400 contains information specific to a certain view. The linkage 402 between structures 400 within a view parallels the relationships between storage objects 30, 32 and 34 within the storage environment as illustrated in FIG. 9. For example, quantitative mapping results in a collection of linked structures 400 that facilitate retrieval of exact information about where data associated with a logical object is located within a volume, a device or a partition. The qualitative mapping algorithm builds a collection of linked structures 400 that facilitate retrieval of subjective information about how data is stored or how frequently data is accessed. The frozen image analysis and generation algorithm employs a collection of linked structures 400 populated with attributes and characteristics of each subcomponent of a logical storage object related to production of frozen images.

In one embodiment, library 350 communicates through plug-in interfaces 356 in order to satisfy the intrinsic need to populate the view with information necessary to execute each algorithm. System 10 depends on the presence of a plug-in 358 for each element 400 of storage stack 390. That is, there must be a plug-in 358 for each file system, volume manager, disk driver and disk array.

In one embodiment, the frozen image analysis and generation algorithm consists of two large processes. The first process analyzes the storage environment by building a view and populating that view with information about what frozen image generation capabilities are available at each node within the view. The analysis algorithm then enumerates the possible methods for creating a frozen image, orders the list of possible methods according to criteria explained below and presents the ordered list to the calling application that picks a freeze method based on criteria that are specific to the application.

The second process is the generation of the frozen image. This process relies on the selection made during the analysis process.

In one embodiment, frozen image generation capabilities within each stack element are revealed through plug-in interfaces 356 to the library 350. These capabilities fall into two categories. The first is stack element quiesce. The second is split type.

Stack element quiesce is an integral part of generating a frozen image. Stack elements such as file systems and volume managers employ sophisticated mechanisms to maximize the efficiency of disk references and to ensure that I/O requests are fully committed to disk. Efficiency is usually accomplished by accruing user data from I/O requests within memory buffers or cache. When cache reaches some threshold of capacity, it is flushed to disk en masse. Consequently the state of data on disk is always different from what the application believes is on disk by the amount of data held in cache. If an application attempts to create a frozen image of a storage object at a certain point in time, the image will not reflect the latest I/O generated by the application. Quiesce is an explicit operation supported by most stack elements that causes the stack element to flush all cached data to disk. In doing so, the stack element reaches a state of transactional consistency.

The manner in which quiesce is supported by file systems and volume managers employed within commercial operating systems varies. Some file systems support the ability to quiesce multiple storage objects simultaneously or atomically. Others support the ability to quiesce only a single instance. In these latter situations, when multiple instances are present, each instance must be quiesced individually in a serial fashion.

When serial quiesce of multiple objects is employed, however, deadlocks may occur within applications with interlocking dependencies on the data within each object. For this reason, the frozen image analysis algorithm attributes a quiesce strength to each of the possible methods for generating a frozen image. Quiesce strength is an important factor in ranking frozen image choices. A high quiesce strength means that the frozen image can be created without concern for deadlocks or transactional consistency. A low quiesce strength means that there is risk that a deadlock can occur or that cached data will not be fully reflected in the disk image. The plug-in 358 for each stack element provides library 350 with information about its quiesce operation—if any. This is called quiesce type.

Split type is the second capability that must be reported by the plug-in 358 for each stack element. Split type refers to the manner in which a point in time image is derived by the stack element. In some situations, a stack element may offer multiple split types. Each split type is given a name and it can be associated with a collection of subjective attributes that further characterize the split type for the benefit of applications in helping to choose a specific method from among many based on subjective criteria. Plug-in 358 also communicates configuration options, if any, that need to be set before the split type can be invoked. Finally, plug-in 358 communicates the name that will be given to the split object after the split type is invoked.

Split types and quiesce types are independent attributes of each stack element. It is possible for a stack element to have a quiesce type and no split type or a split type and no independent quiesce type. Moreover, multiple split types and quiesce types can be introduced by a stack element. For example, a file system can possess both an independent quiesce type and a split type that includes a separate but integral quiesce type.

Figure 10:
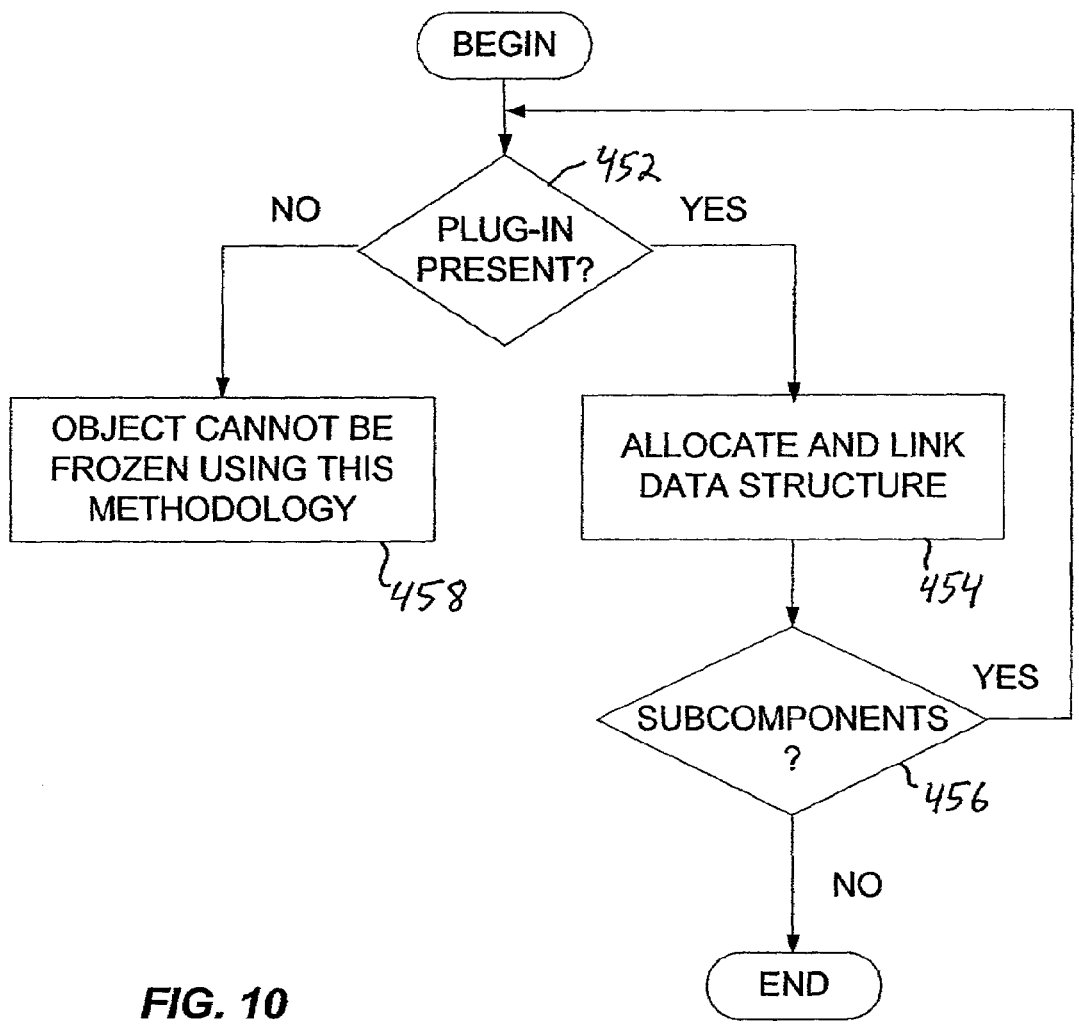
FIG. 10 is a flowchart of a method for generating a data structure that represents a storage environment, according to an embodiment of the invention.

In the following discussion, the term "root object" is used to identify the logical storage object passed by input parameter from the application to library 350. For instance, the root object could be the storage object (or objects) that the application desires to freeze. A process of creating a view of the storage environment for the purpose of frozen image analysis is shown in FIG. 10. In the embodiment shown, process 450 begins by specifying the name of the root object as an input parameter. A tree is then traversed (as shown below) using the root object as the root of the tree and moving down through the hierarchy of logical storage devices to the physical devices, or to partitions of the physical devices.

As shown in FIG. 10, at 452 library 350 determines if a plug-in 358 is present for the storage object 400. In one embodiment, library 350 does this by invoking a claim function for every plug-in 358 installed in the local environment. The claim function within each plug-in 358 examines the storage object 400 and determines if the object corresponds to the stack element to which plug-in 358 is designed. If no plug-in is available, control moves to 458.

At 454, knowing that a suitable plug-in is present for a storage object, a data structure for the object is allocated and linked to its parent.

At 456, library 350 examines the object 400 and makes a request of its associated plug-in 358 to report any subcomponents. For example, when a file system 32 is built on a volume 34, the file system plug-in reports the name of the volume.

If any subcomponents are present, the process moves to 452. If no more subcomponents are discovered, the process is complete.

Someone skilled in the art will appreciate that after the process of FIG. 10 is concluded, a complete view of the storage environment, starting at the root object, will be generated. In one embodiment, that view is stored as a collection of linked data structures 400 as described in FIG. 9.

Each data structure 400 in the view described above is called a node. In one embodiment, in order for the analysis algorithm to perform its ranking function and to ensure that quiesce and split operations are invoked at correct points within the view, quiesce types and split types are gathered and recorded during view generation. Quiesce types and split types are descriptors used by the plug-ins to signify the actual operations used to perform a quiesce or a split.

It is often the case that split types or quiesce types are common among several different nodes in the view. For example, if a root object consists of several instances of a file system that possesses an atomic multi-file system quiesce operation, then the quiesce type for each instance of the file system will be identical with all the others. Nodes that share a specific quiesce type are grouped together under a structure called a quiesce node. Similarly, nodes that share a specific split type are grouped together under a structure called a split node. Split nodes and quiesce nodes are special cases of a structure called a grouping node. Grouping nodes are employed by plug-ins 358 to associate individual nodes in the view with attributes that are common to other nodes. For example, the plug-in for a disk array with split capabilities will recognize when two nodes represent data residing in the same array versus two different arrays.

All nodes in the view that have the same quiesce node value will be affected when a quiesce type is invoked. We use QA to symbolically represent the quiesce attributes for each node. Within QA, we use QN and QT to represent quiesce node and quiesce type, respectively, as in QA=(QN, QT).

All nodes in the view that have the same split node value will be affected when the split type is invoked. We use SA to symbolically represent the split attributes for each node. Within SA, we use SN and ST to represent split node and split type respectively, as in SA=(SN,ST).

Quiesce attributes, QA, and split attributes, SA, are combined to form a QSPLIT vector: QSPLIT(QA,SA).

In one embodiment, an analysis algorithm uses the following node labels to characterize the way in which parents, children and siblings relate to one another within the view. Since nodes represent storage objects, these labels identify how storage objects are aggregated within the view and their relationship to one another.

An ALL node is a node where all children of the node are necessary in order to represent the data associated with the node. For example, a striped or concatenated volume would be labeled as an ALL node because all the disks that make up the volume are required to represent the volume.

An ANY node is a node where any children of the node constitute a complete representation of the data. For example, a mirrored volume would be labeled as an ANY node because any disk represents a complete image of the volume.

An INDIVISIBLE node is a node that represents a complete storage object. For example, a file system node will be marked INDIVISIBLE or when a file system is mounted on a single volume, the volume will be marked INDIVISIBLE. A mirror of an INDIVISIBLE volume will be marked INDIVISIBLE. The components of a striped volume will not be marked INDIVISIBLE because each component only represents a portion of the storage object.

All descendents of a node marked ALL that has multiple children are marked INCOMPLETE.

As discussed above, the ability to flush cache and ensure transactional consistency for each stack element is an important part of obtaining a usable frozen image. Consequently, the analysis algorithm tracks the relationships between nodes in the view and the scope of quiesce (QN) for each QSPLIT. It derives a quantity called quiesce strength, abbreviated QS, which it maintains as it analyzes the view and attributes to each QSPLIT. Quiesce strength for various quiesce types is shown in FIG. 11.

The highest possible quiesce strength within this algorithm is the ability to quiesce multiple file systems simultaneously. The lowest quiesce strength is NONE or no quiesce operation whatsoever. The following QS values (in descending order, as shown in FIG. 11) are recognized:

ATOMIC_FS—The node represents a file system that supports atomic multi-file system quiesce.

ATOMIC_DEV—The node is a device that supports atomic multi-device quiesce.

SERIAL_FS—The node is a file system that supports serial file system quiesce.

SERIAL_DEV—The node is a device that supports serial device quiesce.

NONE—The node supports no form of quiesce.

In one embodiment, the analysis algorithm distinguishes between file system nodes and non-file system nodes for the purpose of calculating QS. The ranking of QS recognizes ATOMIC operations as stronger than SERIAL and operations on file systems to be preferable to operations on non-file systems. Promotion (demotion) of QS is the process of evaluating QN (within QA) in relation to children of a node. When QN is shared by all children, QS can be increased (promoted) from NONE to SERIAL or from NONE to ATOMIC (DEV or FS), or left unchanged. If QN is not shared by all children of a node, QS can be decreased (demoted) from ATOMIC to SERIAL or to NONE (DEV or FS), or left unchanged.

All nodes marked INCOMPLETE have a QS of NONE. The reason for this is that all INCOMPLETE nodes intrinsically have siblings that hold other parts of a storage object and whose parent is the only agent who could coordinate a quiesce operation.

The purpose of the analysis algorithm is to examine the quiesce and split attributes at each node, incorporate its relationship with parents and siblings and construct a set of quiesce and split operations for creating a frozen image of the root object.

For typical storage environments, freezing a root object can usually be accomplished in several ways. For example it may be possible to quiesce at the file system level and split at the disk level or to quiesce at the file system level and split at the volume level. In some situations it may be possible to split at a variety of places within the view but never possible to quiesce the root object. In all cases, a method for freezing the root object will consist of some combination of quiesce and split operations performed on each of its subcomponents. The analysis algorithm uses the node labels discussed above along with the quiesce and split attributes to build a list, called a freeze list, of all possible methods for freezing the root object.

Figure 12:
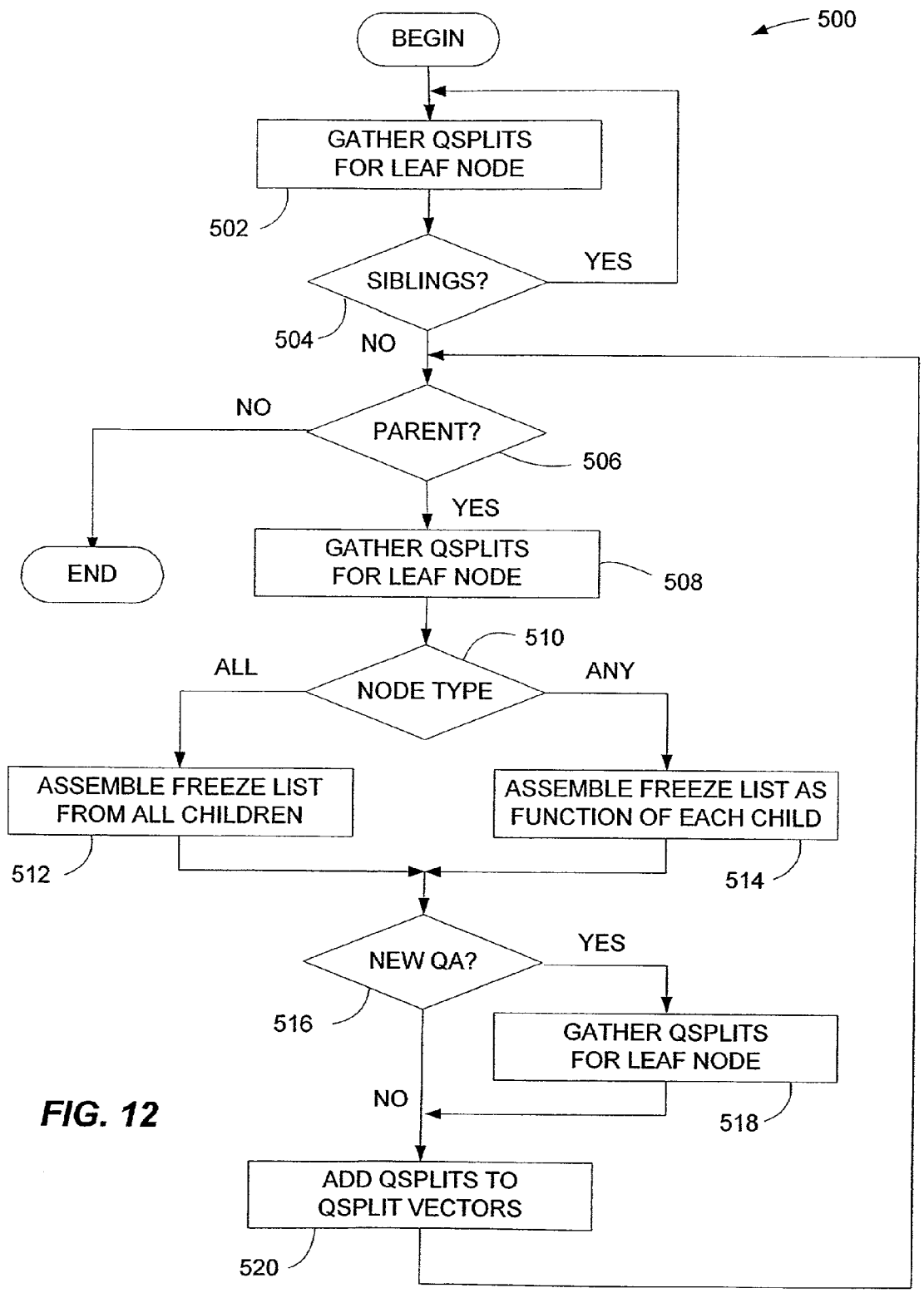
FIG. 12 illustrates a method of determining an optimal way to freeze a logical storage object.

The algorithm begins at the leaves of the tree (generated in FIG. 11) representing the view of the root object. A leaf is a node that has no children. The freeze list for a leaf node starts as an empty list. A method 500 of determining an optimal way to freeze a root object is shown in FIG. 12.

At 502, gather QSPLITs for this node and add to freeze list. Each QSPLIT represents a mechanism for freezing the node in a consistent state.

At 504, determine if there are any siblings. If so, move to 502.

If there are no siblings, move to 506 and determine if there is a parent node. If there is no parent node, end. If, however, there is a parent node, move to 508, gather QSPLITs for the node and add to the freeze list. Then move to 510.

At 510, determine the type of node. If, at 510, the node is an ALL node, control moves to 512, where a frozen image of this node is assembled from the frozen images from each of its children. If the freeze lists from any of the children contain multiple QSPLIT vectors, then a frozen image of the parent can be generated in as many ways as there are combinations of QSPLIT vectors, taken one at a time from each of the children. Control then moves to 516.

For example, consider an ALL node with two children where child 1 has freeze list of QSPLIT(1) or QSPLIT(2) and child 2 has a freeze list of QSPLIT(3) or QSPLIT(4). The freeze list for the parent would be QSPLIT(1) and QSPLIT(3) or QSPLIT(1) and QSPLIT(4) or QSPLIT(2) and QSPLIT(3) or QSPLIT(2) and QSPLIT(4). Form all combinations of QSPLIT vectors in this manner and edit each combination for duplicate quiesce types and split types (based on quiesce node and split node values). Evaluate quiesce strength for each new QSPLIT vector according to the rules mentioned above.

If, however, at 510, the node is an ANY node, control moves to 514 and a frozen image of this node is formed by splitting any of the node's children. Any individual QSPLIT vector from any child represents a frozen image of the parent. The freeze list for this node would then be a simple list of the QSPLIT vectors of each of the children. For example, consider an ANY node with two children where child 1 has freeze list of QSPLIT(1) or QSPLIT(2) and child 2 has a freeze list of QSPLIT(3) or QSPLIT(4). The freeze list for the parent would be QSPLIT(1) or QSPLIT(2) or QSPLIT(3) or QSPLIT(4). Control then moves to 514.

At 516, a check is made to determine if a new QA that operates independently of any SA is added at the node. If not, control moves to 520.

If, however, the check at 516 determines that a new QA that operates independently of any SA has been is added at the node, control moves to 518, where new QSPLIT vectors are created by replacing QA within each QSPLIT by the new QA. The new QSPLIT vectors are then added to the freeze lists created at 512 or 514 above. During this process, QS for all new QSPLITs is promoted based on QN for the new QA.

At 520, the freeze list from 508 is added to the freeze list for this node. Quiesce node is evaluated and QS is promoted, if possible.

If, for instance, a new QA that operates independently of any SA is added at this node, start with the freeze list created at 512 or 514 and create new QSPLIT vectors by replacing QA within each QSPLIT by the new QA. Add these new QSPLITs to the freeze list. During this process, QS for all new QSPLITs is promoted based on QN for the new QA. For example, if the freeze list at a node consists of QSPLIT(1) where QSPLIT(1)=(QA(1),SA(1)) and a new, independent quiesce attribute, QA(2) is added at this node, then a new QSPLIT=(QA(2),SA(1)) is formed and the new freeze list consists of (QA(1),SA(1)) or (QA(2),SA(1)).

Control then moves to 506.

By repeating 506–520 until reaching the top of the view, a freeze list is generated for the root object. In any but the simplest of storage environments, the freeze list for a root object will contain a large number of possible methods for generating the frozen image.

In one embodiment, the freeze list is trimmed as a function of minimum quiesce strength, or as a function of the freeze methods permitted by the application. In one such embodiment, both of these characteristics can be specified as input parameters and the freeze list for the root object is pruned based on the desired characteristics.

After a freeze list has been selected, the frozen image can be generated. This process consists of invoking the individual quiesce and split types within the freeze list. One embodiment of such a process 600 is shown in the flowchart in FIG. 13.

Figure 13:
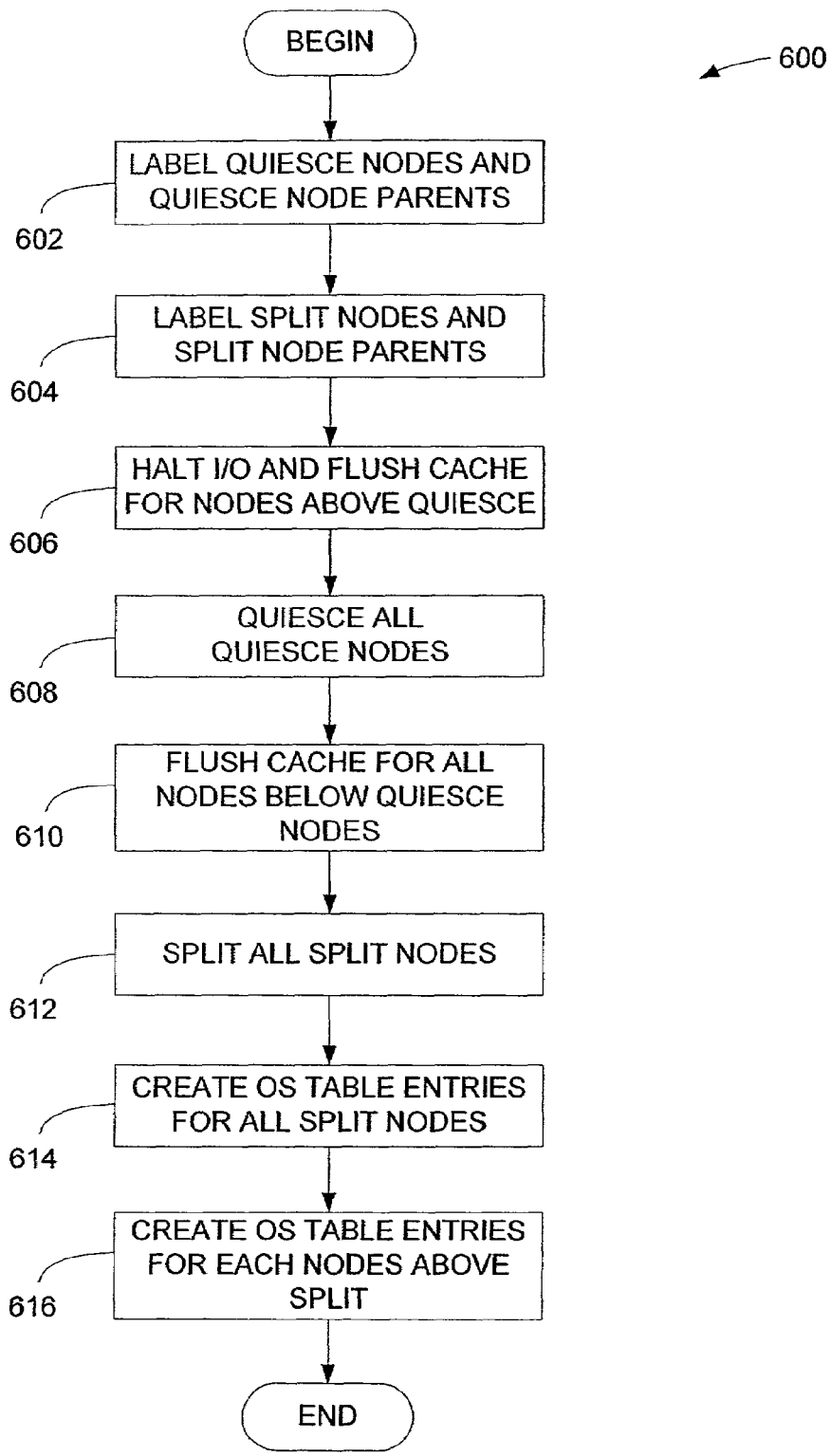
FIG. 13 is a flowchart showing a method of invoking the individual quiesce and split types within the freeze list.

In the flowchart shown in FIG. 13, at 602 each node in the view where a quiesce is performed is labeled QUIESCE. Each node above the QUIESCE node(s) is labeled ABOVE_QUIESCE.

At 604, each node in the view where a split is performed is labeled SPLIT. Each node above the SPLIT nodes(s) is labeled ABOVE_SPLIT.

At 606, starting at the top of the view, I/O is halted and cache is flushed for all nodes marked ABOVE_QUIESCE. The existence of an operation that halts I/O and flushes cache is declared by the plug-in for a particular stack element.

At 608, quiesce type is invoked for all nodes marked QUIESCE.

At 610, cache is flushed for all nodes below the QUIESCE node(s) using operations specified by the stack element plug-ins.

At 612, split type is invoked for each node marked SPLIT. When split type is invoked, the name of the split object, established within the plug-in for that stack element, is reported to library 350.

At 614, library 350 creates an operating system table entry with the name returned by the plug-in for the split object.

At 616, working back up the view, an operating system table entry is created for every node labeled ABOVE_SPLIT until the root object is encountered. The name of the frozen image of the root object is established by input parameter. A operating system table entry is created for the root node and the generation process is concluded.

In some embodiments, the methods described above are implemented as a sequence of instructions which, when executed by a processor, such as processor 18 in FIG. 1, cause the processor to perform the respective method. In some such embodiments, these methods are implemented on a computer-accessible medium having executable instructions capable of directing a processor, such as processor 18 in FIG. 1, to perform the respective method. The computer-accessible medium could be, for example, a magnetic medium, an electronic medium, or an optical medium.

APPARATUS

Figure 14:
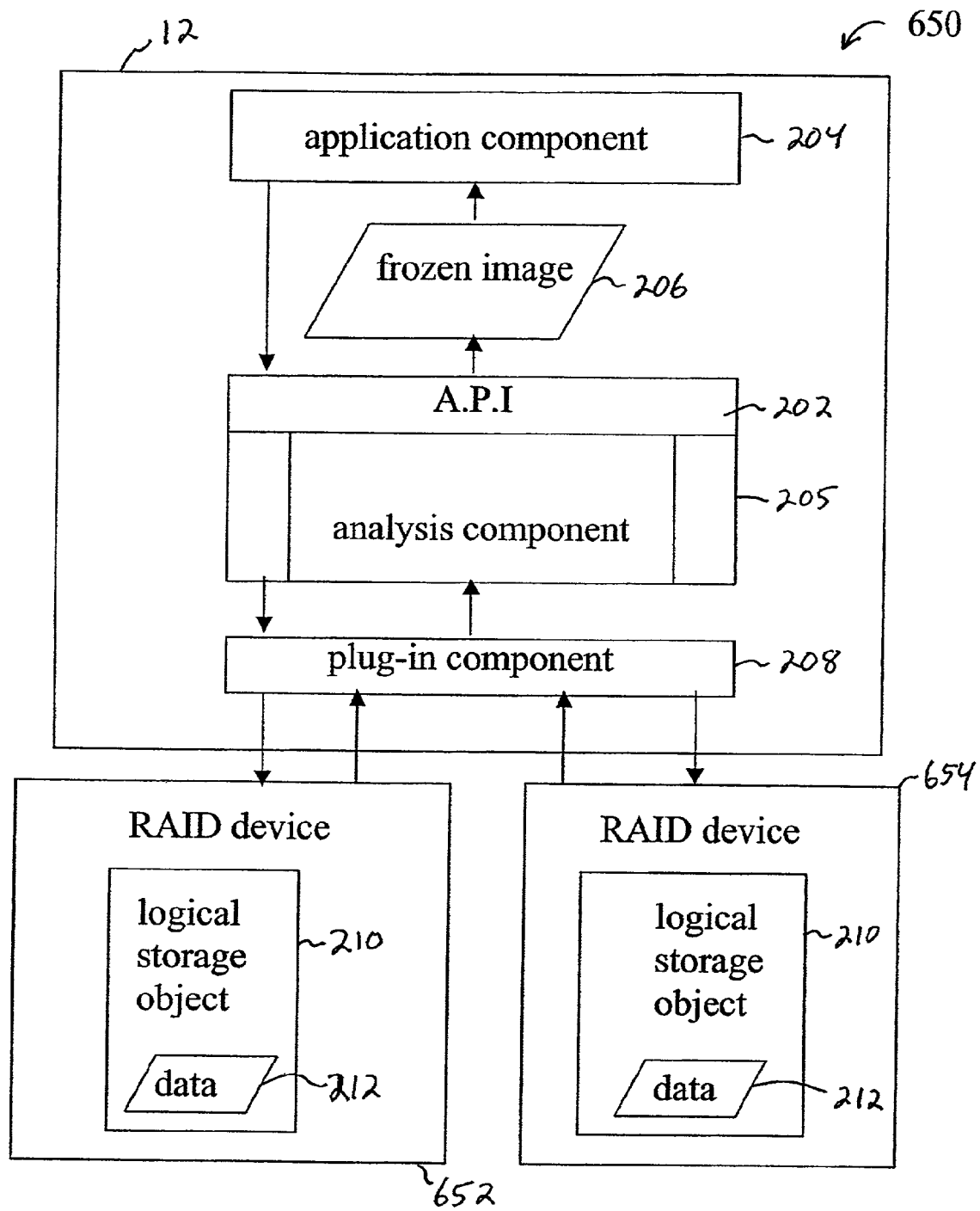
FIG. 14 is a block diagram of an apparatus of managing logical storage objects, according to embodiments of the present invention.

Referring to FIG. 14, a particular implementation of the invention is described in conjunction with the system overview in FIG. 4 and the methods described above. Embodiments of the invention are described as operating in a multi-processing, multi-threaded operating environment on a computer, such as computer 110 in FIG. 1.

FIG. 14 is a block diagram of an apparatus 650 of managing logical storage objects in a storage environment, according to embodiments of the present invention. Embodiments of the invention are described as operating in a multi-processing, multi-threaded operating environment on a computer, such as computer 110 in FIG. 1.

Apparatus 650 provides the ability to readily obtain a frozen image 206 of one or more logical storage objects 652 and 654 by an application component 204. Apparatus 650 includes a processor 12 and one or more RAID devices 652 and 654 coupled to the processor 12. Application component 204 is operable on processor 12. RAID devices 652 and 654 each include one or more logical storage objects 210. Logical storage objects 210 include data 212 that is used by application component 204.

Apparatus 650 also includes an analysis component 205 having an application program interface (A.P.I.) 202 that operably couples analysis component 205 to application component 204. Analysis component 205 is operative on processor 12. Application program interface 202 provides a normalized interface of the analysis component 205 to application component 204. In one embodiment, the analysis mechanism is invoked directly by one of the consumer API calls. For example, vfm_fi_analyze(tree, fi_type_list, Q/S_vector_list)

is used in one embodiment to initiate analysis of a view, where "tree" is a pointer to the view generated by the process illustrated in FIG. 10, fi_type_list is a list of preferences specified by the caller, and Q/S_vector_list is the list of QSPLITs found by the algorithm.

Apparatus 650 also includes a plug-in component 208. Plug-in component 208 is operably coupled to analysis component 205. Plug-in component 208 is associated with a device 652 or 654 in the storage environment. In one embodiment, plug-in component 208 is designed to operate at a specific level with the storage environment, such as at the device driver-level, the snapshot-driver level, the volume-manager level, or the file-system level. In such an embodiment, plug-in component 208 announces the capabilities of the associated device to analysis component 205. For example, where the device in the storage environment is an array manufactured by EMC Corp., plug-in component 208 announces to analysis component 205 what the frozen image capabilities of the EMC array are, and what quiesce capabilities the EMC array has.

In one embodiment, each plug-in component is designed to in accordance with the capabilities of a particular storage environment, such as a particular model of a storage array manufactured by Hitachi, IBM, EMC or NEC. In such an embodiment, plug-in component 208 accounts for the unique syntax of the storage device or object that the particular plug-in component 208 is designed for.

In one embodiment, the interface to frozen-image plug-in 208 includes the following calls:

fi_claim(obj)—Determines if an object corresponds to this plug-in.

fi_init—Initate frozen image session fi_fini—Terminate frozen image session fi_build_tree(tree_token)—Populate view for this stack element fi_tag_tree(tree_token,tag)—Tag view structures for this stack element fi_supports_fi_type(tree_token,fi_type)—Determine if fi_type is supported by element fi_quiesce(tree_token)—Quiesce this stack element fi_unquiesce(tree_token)—Unquiesce this stack element fi_cache_disable(tree_token)—Disable caching for this stack element fi_cache_enable(tree_token)—Enable caching for this stack element fi_prepare_fi(tree_token)—Setup for frozen image
fi_isready(tree_token)—Check for frozen image setup complete
fi_make(tree_token)—Invoke split type for this stack element
fi_build_alt_tree(tree_token)—Construct system node for this stack element
fi_cache_flush(tree_token)—Flush cache for this stack element
fi_destroy_tree(tree_token)—Tear down alternate tree In all of the above, tree_token is a pointer to the storage object view, obj is a pointer to the storage object.

System 650 components can be embodied as computer hardware circuitry or as a computer-readable program, or a combination of both. In another embodiment, system 650 is implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

CONCLUSION

Systems, methods and apparatus to normalize an interface to the quiesce and frozen image functions and attributes of a heterogeneous storage environment has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in procedural terms, one of ordinary skill in the art will appreciate that the invention can be implemented in a object-oriented design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The terminology used in this application with respect to is meant to include all database and communication environments and alternate technologies which provide the same functionality as described herein. Therefore, it is manifestly intended that this invention be limited only by the following claims and equivalents thereof.

What is claimed is:

1. A method comprising:
   transmitting data to an application programming interface identifying a storage object; and
   receiving, from the application programming interface, a freeze list with one or more freeze methods appropriate for freezing the storage object, wherein each freeze method includes a measure of quiesce strength, wherein the measure of quiesce strength is indicative of a predicted level of risk of data inconsistency or deadlock associated with the freeze method.

2. A computer-readable medium having program code which, when executed on a computer, implements the method of claim 1.

3. A method comprising:
   transmitting data to an application programming interface identifying a storage object;
   receiving a freeze list with one or more freeze methods appropriate for quiescing the storage object from the application programming interface, wherein each freeze method includes a measure of quiesce strength, wherein the measure of quiesce strength is indicative of a predicted level of risk of data inconsistency or deadlock associated with the freeze method;
   selecting one of the freeze methods; and
   issuing a command to the application programming interface to execute the freeze method.

4. The method of claim 3, wherein selecting is a function of quiesce strength.

5. A computer-readable medium having program code which, when executed on a computer, implements the method of claim 3.

6. An application program interface that operates with an application to generate frozen images of a storage object, the interface comprising:
   means for receiving data identifying a storage object;
   means for returning a freeze list with one or more freeze methods appropriate for freezing the storage object, wherein each freeze method includes a measure of quiesce strength, wherein the measure of quiesce strength is indicative of a predicted level of risk of data inconsistency or deadlock associated with the freeze method;
   means for receiving a selected freeze method associated with the storage object; and
   means for returning a frozen image as a function of the selected freeze method.

7. The application program interface of claim 6, wherein the means for receiving data identifying a storage object includes a call which identifies the storage object and provides a list of preferences.

8. An application program interface that operates with an application to generate frozen images of a storage object, the interface comprising:
   means for receiving data identifying a storage object; and
   means for returning a frozen image of the storage object, wherein the means for returning a frozen image includes means for
      transmitting a freeze list having one or more freeze methods appropriate for freezing the storage object, wherein each freeze method includes a measure of quiesce strength, wherein the measure of quiesce strength is indicative of a predicted level of risk of data inconsistency or deadlock associated with the freeze method, and transmitting a frozen image representative of the storage object.

9. The application program interface of claim 8, wherein the means for receiving data identifying a storage object includes a call which identifies the storage object and provides a list of preferences.

10. An application program interface for controlling formation of a frozen image of a storage object the interface comprising:
   a storage object identifier, wherein the storage object identifier identifies the storage object;
   a freeze list data structure, wherein the freeze list data structure stores data representing one or more freeze methods appropriate for freezing the storage object;
   a freeze method identifier, wherein the freeze method identifier identifies a selected freeze method from the one or more freeze methods, wherein each freeze method includes a measure of quiesce strength, wherein the measure of quiesce strength is indicative of a predicted level of risk of data inconsistency or deadlock associated with the freeze method; and
   a data structure for returning a frozen image corresponding to the selected freeze method.

11. The application program interface of claim 10, wherein the storage object identifier is transferred within a call to the application program interface.

12. An application program interface for controlling quiescing of a storage object, the interface comprising:
   a storage object identifier, wherein the storage object identifier identifies the storage object;
   a quiesce data structure, wherein the quiesce data structure stares data representing one or more quiesce methods appropriate for quiescing the storage object, wherein each quiesce method includes a measure of quiesce strength, wherein the measure of quiesce strength is indicative of a predicted level of risk of data inconsistency or deadlock associated with the quiesce method; and
   a quiesce method identifier, wherein the quiesce method identifier identifies a selected quiesce method from the one or more quiesce methods.

13. The application program interface of claim 12, wherein the application program interface transmits a signal on completion of storage object quiesce.

14. The application program interface of claim 12, wherein the storage object identifier is transferred within a call to the application program interface.

15. An application program interface for controlling quiescing of a storage object, the interface comprising:
   means for receiving data identifying a storage object;
   means for transmitting a quiesce list having one or more quiesce methods appropriate for quiescing the storage object, wherein each quiesce method includes a measure of quiesce strength, wherein the measure of quiesce strength is indicative of a predicted level of risk of data inconsistency or deadlock associated with the quiesce method; and
   means for returning an indication that the storage object is quiesced.

16. The application program interface of claim 15, wherein the means for receiving data identifying a storage object includes a call which identifies the storage object and provides a list of preferences.

17. A method comprising:
   transmitting data to an application programming interface identifying a storage object; and
   receiving a quiesce list with one or more quiesce methods appropriate for quiescing the storage object from the application programming interface, wherein each quiesce method includes a measure of quiesce strength, wherein the measure of quiesce strength is indicative of a predicted level of risk of data inconsistency or deadlock associated with the quiesce method.

18. A computer-readable medium having program code which, when executed on a computer, implements the method of claim 17.

* * * * *